United States Patent
Takami

(10) Patent No.: US 6,829,003 B2
(45) Date of Patent: Dec. 7, 2004

(54) SAMPLING PULSE GENERATOR OF ELECTRONIC ENDOSCOPE

(75) Inventor: Satoshi Takami, Saitama (JP)

(73) Assignee: PENTAX Corporation, Tokyo (JP)

(*) Notice: Subject to any disclaimer, the term of this patent is extended or adjusted under 35 U.S.C. 154(b) by 726 days.

(21) Appl. No.: 09/867,555

(22) Filed: May 31, 2001

(65) Prior Publication Data

US 2001/0048466 A1 Dec. 6, 2001

(30) Foreign Application Priority Data

Jun. 2, 2000 (JP) .................................... P2000-165563
Jun. 2, 2000 (JP) .................................... P2000-165579

(51) Int. Cl.[7] .......................... A61B 1/04; H04N 7/18; H04N 9/47
(52) U.S. Cl. ........................ 348/76; 348/500; 348/536; 348/537
(58) Field of Search .......................... 348/76, 500, 537, 348/536

(56) References Cited

U.S. PATENT DOCUMENTS

| 5,434,615 A | 7/1995 | Matumoto |
| 5,984,862 A | 11/1999 | Honda et al. |
| 6,126,593 A | 10/2000 | Honda et al. |
| 6,231,504 B1 | 5/2001 | Honda et al. |
| 6,261,228 B1 | 7/2001 | Honda et al. |
| 6,310,565 B1 * | 10/2001 | Ong et al. .................. 341/122 |
| 6,392,219 B1 * | 5/2002 | McCormick et al. ... 250/214 R |
| 6,438,366 B1 * | 8/2002 | Lindfors et al. ............ 455/334 |

FOREIGN PATENT DOCUMENTS

| JP | 5-176883 | 7/1993 |
| JP | 2790948 | 6/1998 |

* cited by examiner

*Primary Examiner*—Chris Kelley
*Assistant Examiner*—Charles Parsons
(74) *Attorney, Agent, or Firm*—Greenblum & Bernstein, P.L.C.

(57) ABSTRACT

A sampling pulse generator for an electronic endoscope that comprises a CDS circuit, OR circuits, a clock pulse generator, a shift counter, first and second switch groups, EEPROM and a CPU, is provided. The generator cyclically generates clock pulses. The pulses are cyclically counted between 0 and 9 by the counter. The counter has ten output terminals that correspond to each of the count numbers. A signal is only output to a terminal corresponding to the current count number. Each of the first and second switch groups has ten switches that are connected to each of the terminals. With data in the EEPROM, the on-off states of the switches are set by the CPU. The CCD drive pulses are generated by signals from the terminals via OR circuits. The clamp pulse and sample-hold pulse are generated by signals from the switch groups which are set in the on state.

9 Claims, 9 Drawing Sheets

SAMPLING PULSE GENERATOR OF ELECTRONIC ENDOSCOPE

BACKGROUND OF THE INVENTION

1. Field of the Invention

The present invention relates to a timing generator provided for an electronic endoscope unit, which generates pulse signals for image signal sampling.

2. Description of the Related Art

In recent medical practice, electronic endoscopes have been widely used for medical examinations. An electronic endoscope is utilized with an image-signal processing unit and image-indicating device, such as a TV monitor. The electronic endoscope is connected to the image-signal processing unit and an image captured at the end of the flexible conduit of the endoscope is fed to the image indicating device through the image-signal processing unit and displayed. Various types of electronic endoscopes are utilized for examinations. However, it is a waste of space and money to have an image-signal processing unit for each electronic endoscope. It is better for an image-signal processing unit to be shared among several electronic endoscopes, in which signal processing is common.

An imaging device, such as a CCD (charged coupled device), is attached to the distal end of a flexible conduit of an electronic endoscope, which is inserted into a body cavity or hollow organ, hence, the distal end of the endoscope is required to be miniature. Therefore, a CCD driver, which feeds driving signals to the CCD, or a CDS (correlated double sampling) circuit, which samples input-image-signals from the CCD and holds an output value of the most recent sampling, are conventionally disposed in the image-signal processing unit, which is externally prepared for the endoscope. The delay time between the output of the driving signals from the CCD driver and the input of image signals, which are detected by the foregoing driving signals, to the CDS circuit, relates to the length of the endoscope. Lengths of electronic endoscopes vary from a meter or less to several meters, thus the delay time for signal transmission turns out to be considerable for image-signal processing. Among the electronic endoscopes that share one image-signal processing unit, the length of the flexible conduit of the endoscopes varies according to the use of the endoscope. The amount of time required for sampling the image signals from the CCD, at the CDS, depends on the length of the flexible conduit of the endoscope. Therefore, in a conventional image-signal processing unit, delay lines that correspond to electronic endoscopes of which the length of each flexible conduit is different, are provided for executing appropriate sampling and holding for image signals. However, in the case of sharing of the image-signal processing unit among numerous electronic endoscopes that have dissimilar lengths of flexible conduit, numerous delay lines are required for the image-signal processing unit. Further operators need to switch the delay lines when they change the electronic endoscopes connected to the image-signal processing unit. So that the construction of the image-signal processing unit and its operations are cumbersome.

In Japanese Patent No. 2790948, an electronic endoscope unit is described that is provided a CDS circuit and a circuit which can change phase between a clamp pulse and a sample pulse fed to the CDS circuit. These circuits are inside the operating handle or a connecting part of an electronic endoscope, which is used to connect the electronic endoscope to an image-signal processing unit. The phase between the clamp pulse and sample pulse is adjusted by controlling the time constant of the R-C circuit that comprises a potentiometer. However, as for miniaturizing a circuit, a circuit comprising a potentiometer is at a disadvantage. Further, in an analog circuit, devices should be placed mutually close together. Therefore, in the disclosed electronic endoscope unit, the potentiometer, CCD driver and CDS circuit are required to be placed integrally in close formation. Further, in order to facilitate the operation of the phase adjustment, the potentiometer should be disposed at an accessible position and also a cover for the potentiometer should be formed in a structure that can be easily detached from the body, when an adjustment is required. However, since the electronic endoscope is frequently syringed, the above disposition and structure is inferior from the aspect of the waterproofing of the electrical devices, i.e. the potentiometer, CCD driver, and CDS circuit. Further, the above problems, such as the miniaturizing difficulty of the circuit, the disposition of the potentiometer, and the structure of the cover, also enlarge the size and limit the form of the operating handle of the endoscope. Since in the design of the operating handle, manipulation is a significant factor, thus the above problems are serious. Furthermore, since the size of the adjustment knob of the potentiometer is small, operation of the knob, to adjust the phase, is quite difficult.

SUMMARY OF THE INVENTION

Therefore, an object of the present invention is to provide a miniaturized sampling pulse generator for an electronic endoscope, which has high flexibility in circuit arrangement and ease of phase adjustment.

According to the present invention, a sampling pulse generator utilized in an electronic endoscope with an imaging device is provided that comprises a sampling circuit, driving pulse generating processor, clock pulse generator, shift counter, first switch group, second switch group, and switch setting processor.

The sampling circuit samples image signals obtained by the image capturing device and the driving pulse generating processor generates driving pulses for the imaging device. The clock pulse generator cyclically generates clock pulses and the pulses are cyclically counted within a predetermined number by the shift counter. The shift counter comprises a predetermined number of output terminals and each of the count numbers, within the predetermined number, corresponds to the output terminals by one-to-one. Further, a signal is only output to a terminal corresponding to a current count number. The first and second switch group comprises switches connected to each of the output terminals. The switch setting processor sets the on-off states of the switches in the first and second switch groups. Furthermore, the driving pulse generating processor generates the driving pulses by signals from the output terminals of the shift counter and at least two types of sample pulses that control the sampling circuit are generated by signals from the first and second switch groups. The switch setting processor sets the on-off states of the first and second switch groups.

The switch setting processor may comprise a recording medium that records data relating to the on-off states for the first and second switch groups. In this case, the on-off states of the first and second switch groups are set in accordance with the data recorded in the recording medium.

The sampling pulse generator may further comprise a recording processor that sets the data and the recording processor may be controlled by instructions from a computer connected to the electronic endoscope. For example, the recording medium is EEPROM.

Preferably, a correlated double sampling circuit is utilized as the sampling circuit and the two types of sample pulses are clamp pulses and sample-hold pulses. In this case, the clamp pulse is output from the first switch group and the sample-hold pulse is output from the second switch group.

Preferably, the driving pulses are generated by logical sum of signals fed from predetermined terminals of the output terminals and these terminals correspond to consecutive count numbers of the cyclic count within the predetermined number.

For example, a CCD is utilized as the imaging device and the driving pulses comprise a CCD horizontal-register transfer clock. In this case, the CCD horizontal-register transfer clock is generated by signals from the predetermined terminals and the number of the predetermined terminals corresponds to half of the predetermined number.

Further, the switch setting processor may comprise a third switch group that sets the on-off states of the first and second switch groups. In this case, the on-off states of the first and second switch groups are set in accordance with binary data produced by switches in the third switch group.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
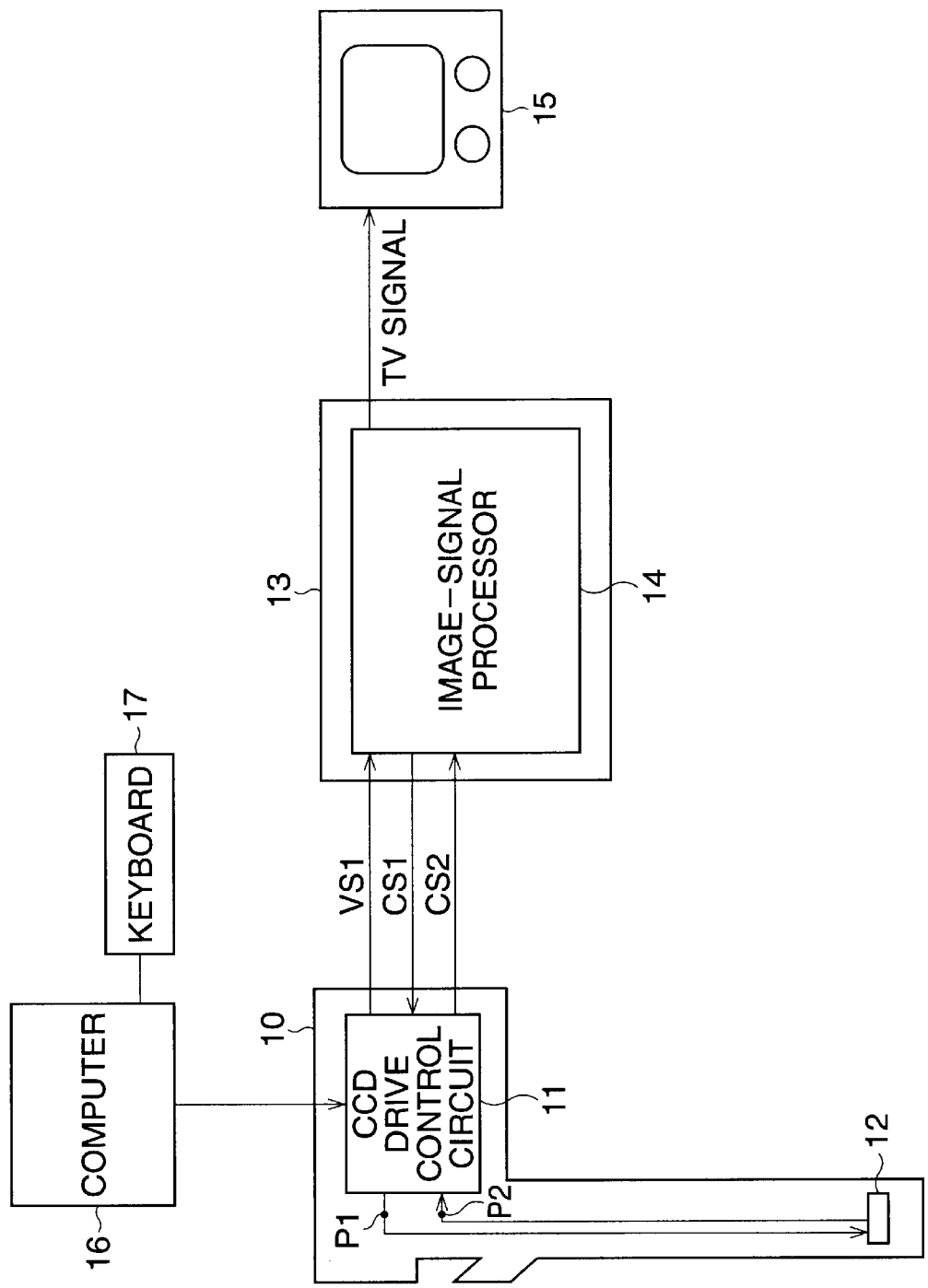
FIG. 1 is a schematic showing an electrical construction of an electronic endoscope system of the first embodiment of the present invention.

The present invention is described below with reference to the embodiments shown in the drawings.

FIG. 1 is a schematic showing a construction of an electronic endoscope system of the first embodiment of the present invention.

An electronic endoscope 10 is detachably connected to an image-signal processing unit 13 and the image-signal processing unit 13 is connected to an image indicating device, such as TV monitor 15, by a video cable. Inside the operating handle of the electronic endoscope 10, a CCD drive control circuit 11 is provided. On the distal end of the flexible conduit of the endoscope, a CCD (imaging device) 12 is provided. Further, an image-signal processor 14 is provided in the image-signal processing unit 13. The CCD 12 is controlled by CCD driving pulses (e.g. a CCD horizontal-register transfer clock and reset gate clock) which are fed from the CCD drive control circuit 11, and an image capturing process using a conventional R (red), G (green), B (blue) sequential method is carried out. Signals detected by the CCD 12 are sampled at a CDS circuit (refer FIG. 2) inside the CCD drive control circuit 11, then transferred to the image-signal processor 14 of the image-signal processing unit 13 as video signals VS1.

At the image-signal processor 14, a conventional signal processing is executed to the video signals VS1 from the electronic endoscope 10. Namely, the video signals VS1 are subjected to prepositional signal processing, i.e., moderate pre-amplifying and video bandwidth filtering, S/H (sample hold), amplifying, clamping, clipping, gamma correction, etc. The video signals are then converted to digital image signal. The digital image signals are temporally stored in the image memories (not shown) for each R, G, and B component as R, G, and B image data. When one set of image data comprising R, G, and B images is prepared in the image memory, the R, G, and B image data is converted to analog signals and postpositional signal processing is applied. In the postpositional signal processing, a filtering, amplifying, gamma correction, clamping, clipping, enhancing, signal level adjustment process, and so on, are executed. The analog video signals may be transformed to composite video signals, in which form they are conventionally standardized for a television system, and are fed to the TV monitor 15.

Between the electronic endoscope 10 and image-signal processing unit 13, signal CS1 and CS are also transmitted from one to another. The signal CS1 is fed from the image-signal processor 14 to the electronic endoscope 10 and it comprises data relating to the timing for the CCD drive, adjustment of color balance, and so on. On the other hand, the signal CS2 is fed from the electronic endoscope 10 to the image-signal processor 14. The signal CS2, for example, comprises data relating to information about the electronic endoscope that is connected and an attachment signal that informs whether the endoscope is connected to the image-signal processing unit 13.

When the electronic endoscope is shipped from a factory or when maintenance is carried out, the CCD drive control circuit 11 of the electronic endoscope 10 is connected to a computer 16, so that output timing of the CCD driving pulse and CDS control pulses (i.e. clamp pulse and sample-hold pulse) are adjusted. Namely, relative phase between the CCD driving pulse and the CDS control pulses is adjusted. For example, the delay time of a signal transmission in the electronic endoscope is induced from the waveform obtained by an oscilloscope (not shown) connected to an output terminal P1, which feeds the CCD driving pulse to the CCD 12, and input terminal P2, which receives video signals from the CCD 12, of the CCD drive control circuit 11. By operating the keyboard 17 of the computer 16, the delay time induced by the oscilloscope is input to the CCD drive control circuit 11, so that the phase between the CCD driving pulse and the CDS control pulses is adjusted.

Figure 2:
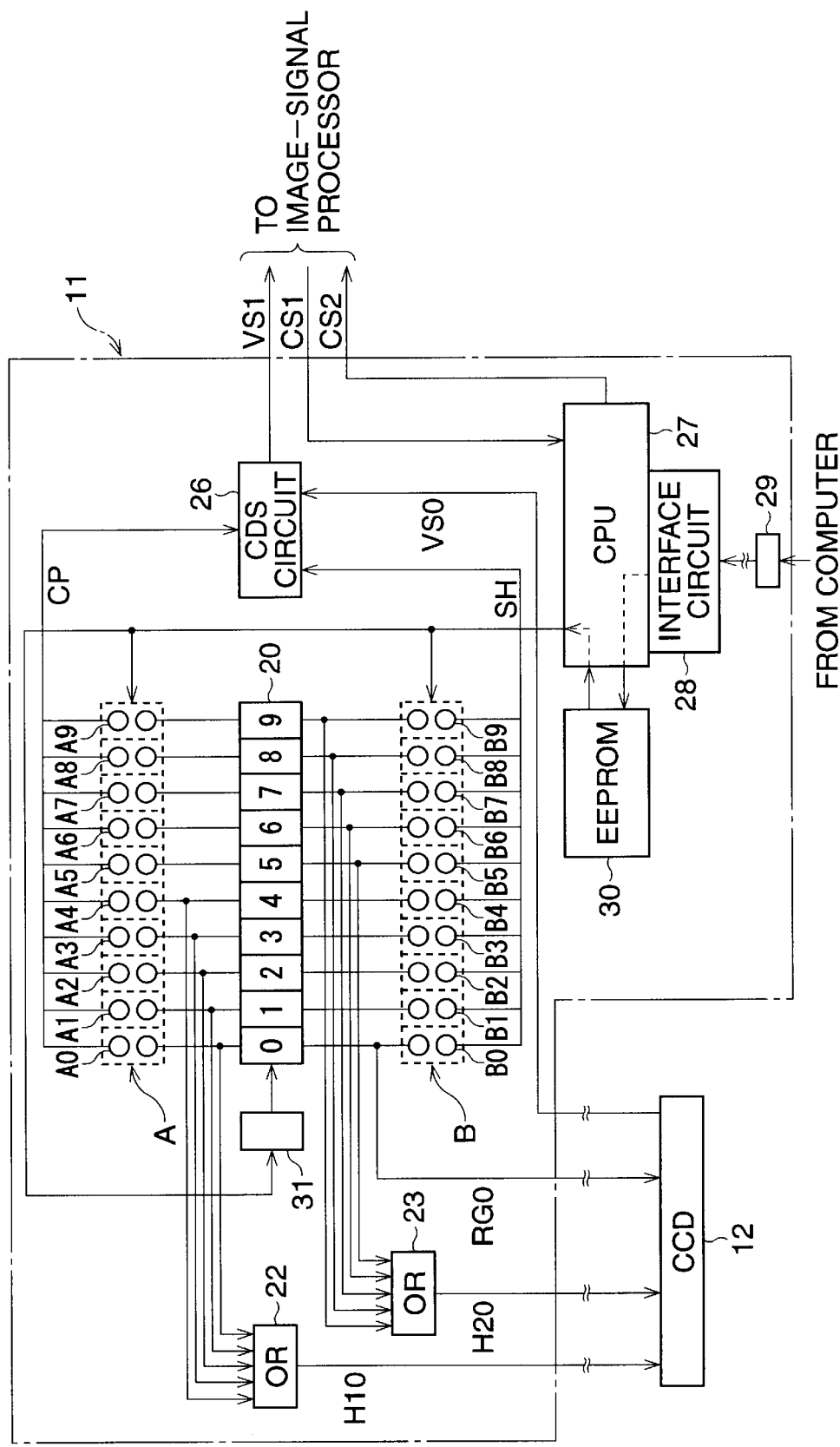
FIG. 2 illustrates the details of the CCD drive control circuit in the first embodiment.

With reference to FIG. 2, the details of the CCD drive control circuit 11 in the present embodiment is explained. FIG. 2 schematically shows a block diagram of the electrical structure of the CCD drive control circuit 11 in FIG. 1.

The CCD drive control circuit 11 comprises a shift counter 20, OR circuits 22 and 23, switch groups A and B (first and second switch groups), CDS circuit 26, CPU 27, clock pulse generator 31, interface circuit 28 and recording medium, such as EEPROM (electrically erasable programmable read only memory) 30.

Video signals VS0 from the CCD 12 are sampled at the CDS circuit 26, then output to the image-signal processing unit 13 (refer FIG. 1) as video signals VS1. The CDS circuit 26 is controlled by CDS control pulses, i.e. clamp pulse CP and sample-hold pulse SH. The clamp pulse CP is output from the switch group A which comprises ten switches A0 to A9. The sample-hold pulse SH is output from the switch group B which comprises ten switches B0 to B9.

Each of the switches A0–A9 and B0–B9 of the switch groups A and B is respectively connected to the shift counter 20. Numbers, 0 to 9, inscribed in each square of the shift counter 20 correspond to a number counted by the shift counter 20. The squares represent the terminals of the shift counter 20. Namely, the shift counter 20 in FIG. 2 schematically indicates a function of the shift counter 20. The shift counter 20 counts the number of regular pulse signals (clock pulses), which are fed from the clock pulse generator 31, with in a predetermined number. In this embodiment, the clock pulses are counted in the range between 0 to 9. Pulse signals are output to the respective terminals of the shift counter 20, which correspond to the current count number of the shift counter 20. When the count number reaches the maximum number 9, the shift counter 20 again starts counting from 0 and this counting process is repeated.

Switches A0 to A9 and B0 to B9 are connected to the terminals of the shift counter 20, which respectively correspond to each of the count numbers 0 to 9 by one-to-one. Therefore, the shift counter 20 outputs a pulse signal to the switch corresponding to the current count number. For example, if the current count number of the shift counter 20 is 0, a pulse signal is output to the corresponding switches A0 and B0. Succeedingly, when the count number is incremented to 1, a pulse signal is output to the switches A1 and B1, which correspond to the current count number 1, and the pulse signal output to the switches A0 and B0 is terminated. In the same way, pulse signals are output to each of the switches A2, B2 to A9, B9 as a set. This output process of the pulse signals is cyclically executed.

A clamp pulse CP is output from the shift counter 20 via an on-state switch of the switch group A. A sample-hold pulse SH is output from the shift counter 20 via an on-state switch of the switch group B. The on or off states of the switch groups A and B are set by the CPU 27 according to data stored in the EEPROM 30. As mentioned above, an operator can set the data by connecting the computer 16 to the electronic endoscope 10 (see FIG. 1) and operating the keyboard 17. Namely, the CPU 27 can be connected with the computer 16 via an interface cable connected to a connector 29 and is able to interchange data with the computer 16 through an interface circuit 28. Thus, the CPU 27 may set or reset data stored in the EEPROM 30 according to instructions from the computer 16.

The OR circuit 22 is connected to the terminals corresponding to the count numbers 0 to 4 of the shift counter 20. The OR circuit 22 takes the logical sum of the pulse signals fed from the above four terminals. The pulse signals logically summed at the OR circuit 22 are output to the CCD 12 as a horizontal-register transfer clock H10 that drives horizontal transfer at the CCD 12. Namely, the horizontal-register transfer clock H10 becomes high when the count number of the shift counter is between 0 to 4 and becomes low when the count number is between 5 to 9, and this process is cyclically repeated. As a result, the horizontal-register transfer clock H10 becomes a periodical pulse signal. On the other hand, the OR circuit 23 is connected to the terminals corresponding to the count numbers 5 to 9 of the shift counter 20. The OR circuit 23 takes the logical sum of the pulse signals fed from the above four terminals. The pulse signals logically summed at the OR circuit 23 are output to the CCD 12 as a horizontal-register transfer clock H20 that drives horizontal transfer at the CCD 12. Namely, the horizontal-register transfer clock H20 becomes low when the count number of the shift counter is between 0 to 4 and becomes high when the count number is between 5 to 9, and this process is cyclically repeated. As a result, the horizontal-register transfer clock H20 becomes a periodical pulse signal. Further, the terminal corresponding to the count number 0 of the shift counter is connected to a terminal of the CCD 12 to which a reset gate clock is applied. Therefore, a pulse signal that is output from the shift counter 20 when the count number is 0, is applied to the CCD 12 as a reset gate clock RG0.

Note that, the clock pulse generator 31 is connected to the CPU 27 and controlled by instructions from the CPU 27. Further, the CPU 27 and the image-signal processor 14 (refer FIG. 1) of the image-signal processing unit 13 are connected to each other via a connecter (not shown). The signals CS1 and CS2 are intertransfered between the CPU 27 and the image-signal processor 14.

Figure 3:
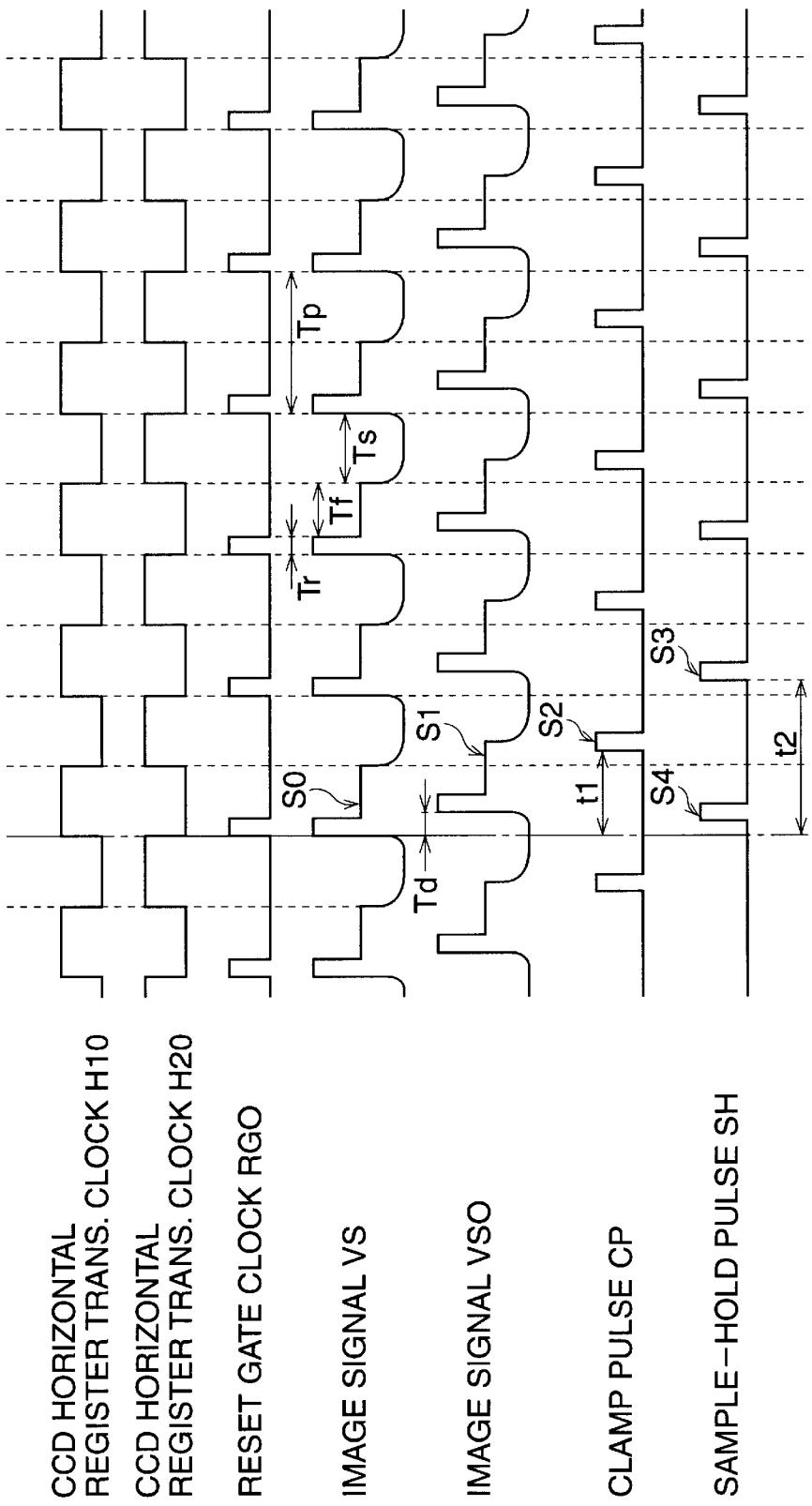
FIG. 3 is a timing chart showing relations among the CCD drive pulse, image signal, and sample pulses.
Figure 4:
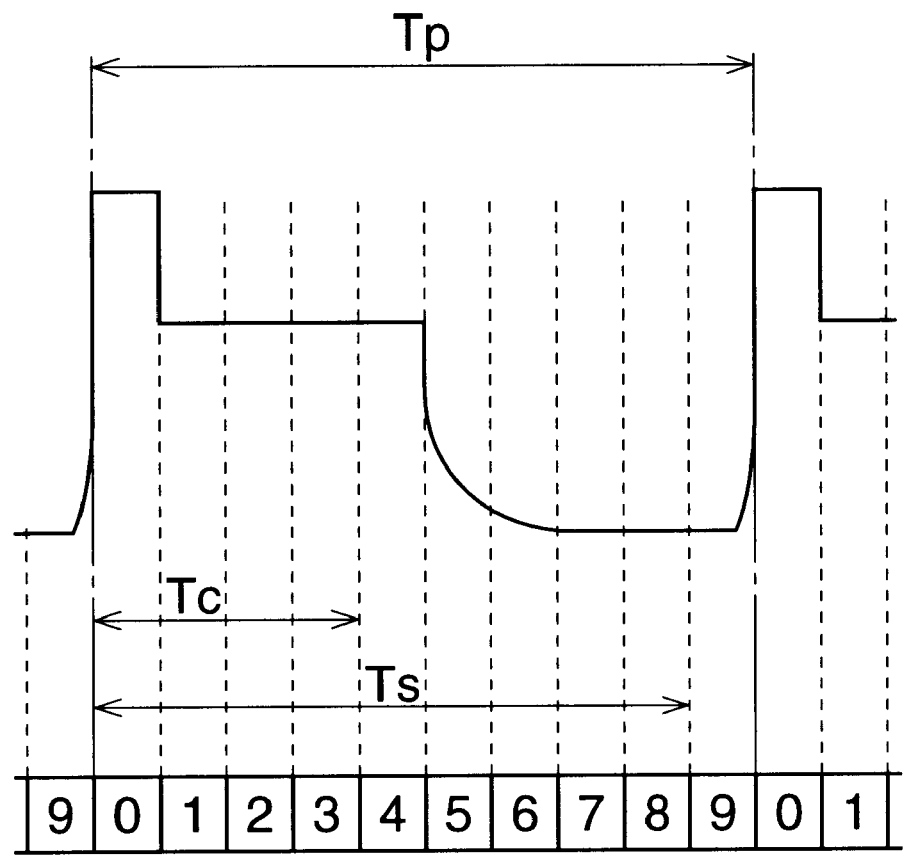
FIG. 4 indicates relations between the image signal and the count numbers of the shift counter.

With reference to FIGS. 2 through 4, a pulse signal generating operation for the CCD drive pulse and CDS control pulse in the present embodiment is explained.

In FIG. 3, the timing of the horizontal-register transfer clocks H10 and H20, reset gate clock RG0, image signals VS and VS0, clamp pulse CP, and sample-hold pulse SH is indicated. The horizontal-register transfer clocks H10 and H20 are signals fed from the respective OR circuit 22 and 23. The image signal VS is the signal at the output terminal of the CCD 12 when the above horizontal-register transfer clocks H10, H20 and reset gate clock RG0 are applied to the CCD 12 without a delay. The period Tr is the reset period that corresponds to the pulse width of the reset gate clock RG0. The period Tf is a feed through period that only outputs a reset noise which is settled during a reset period. Further, the period Ts is an image-signal output period that outputs a signal, in which a reset noise signal and image signal detected at each of the pixels in CCD 12 are superimposed.

The period for the shift counter 20 to count the number from 0 to 9 corresponds to the periods of the horizontal-register transfer clocks H10 and H20. Namely, it corresponds to a pixel clock period Tp, for example, 69.8 ns and a count in the shift counter 20 is Tp/10. Therefore, the pulse width of the reset gate clock RG0 (the reset period Tr), which is output when the count number is 0, is Tp/10.

The image signal VS0 is a signal at the input terminal of the CDS circuit 26, when time delay at the flexible conduit is taken into consideration. Thus, the image signal VS0 is relatively delayed Td when it is compared with the image signal VS. Namely, the image signal VS0 is delayed for the time required for the CCD drive pulses fed from the CCD drive control circuit 11 to reach the CCD 12 and the image signal output from the CCD 12 to reach the CDS circuit 26. Note that, an image signal S0 for one period of the image signal VS corresponds to an image signal S1 for one period of the image signal VS0. For example, the delay time Td is about 14 ns when the length of the flexible conduit is a little bit longer than 2 meters, which corresponds to a little bit longer than 4 meters for the round trip in a signal wire. When the pixel clock period Tp is 69.8 ns, the above 14 ns corresponds to a two count period of the shift counter 20, since $14/69.8 \times 10 \approx 2$.

FIG. 4 indicates the relations between the image signal VS, which disregards the delay, and the count numbers of the shift counter 20 for one period. Assuming that the most suitable timing for clamping the signal in FIG. 4 is when the count number of the shift counter 20 is 4 (Tc period after the beginning of the reset period Tr) and the most suitable timing for sampling and holding the signal in FIG. 4 is when the count number is 9 (Ts period after the beginning of the reset period Tr), the most suitable timing for clamping and sample-holding the image signal VS0 (the image signal delayed for the Td period) is delayed for the period Td. Thus, the output timing of the clamp pulse CP and sample-hold pulse SH should be delayed for the period Td. When the delay time Td corresponds to the two counts of the shift counter 20, as described above, suitable timings for each of the signals are delayed for the two counts, so that the most suitable output timing for the clamp pulse CP and sample-hold pulse SH are when the count number is 6 and 1, respectively. Namely, in the switch group A, the switch A6 is switched on and in the switch group B, the switch B1 is switched on.

The output timing of the clamp pulse CP and sample-hold pulse SH indicated in FIG. 3 are for the image signal VS0. Namely, signals S2 and S3 are the clamp pulse and sample-hold pulse for the signal S1. The period t1 is equivalent to a period Td+Tc that corresponds to the seven counts (the count number 0 to 6) of the shift counter 20. Further, the period t2 in FIG. 3 is equivalent to the period Td+Ts that corresponds to the 12 counts (the count number 0 to 9 and 0 to 1 of the succeeding period) of the shift counter 20. Note that, a pulse signal S4 is a sample-hold pulse for an image signal of the foregoing period.

In the above example explains the pulse signal output operation when the delay time Td is shorter than the pixel clock period Tp. However, a similar operation can be performed even when the delay time is longer than the pixel clock period Tp. The following example explains a pulse signal output operation performed when the delay time is longer than the pixel clock period Tp, with reference to FIG. 5.

Figure 5:
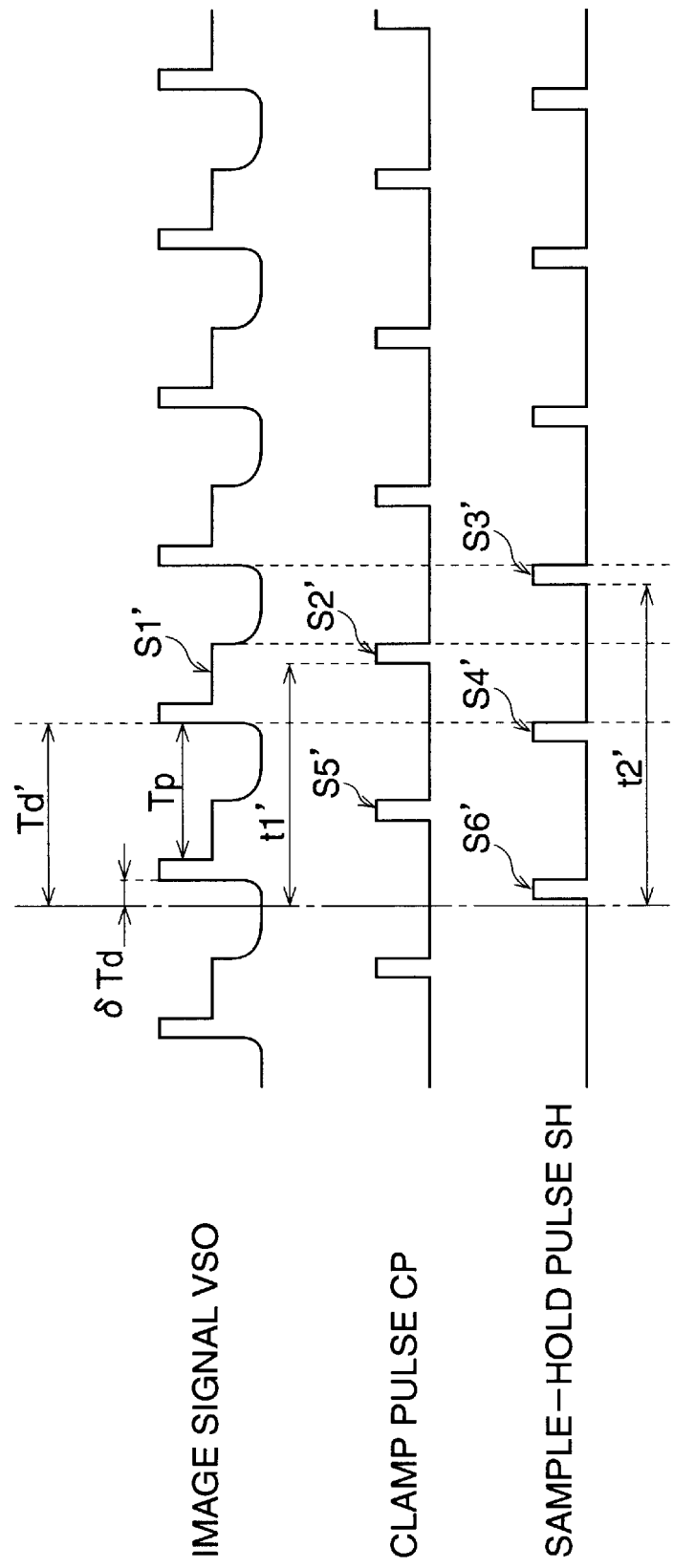
FIG. 5 is a timing chart for the image signal and the CDS control pulses, when delay time is longer than the pixel clock period.

FIG. 5 indicates the image signal VS0, which is input to the CDS circuit 26, and the CDS control pulse for sampling the image signal, when a delay time Td' is longer than the pixel clock period Tp for a period δTd (δTd<Tp), namely, when Td'=Tp+δTd. An image signal S1' is one period of an image signal which is delayed Td' from the output of the reset gate clock RG0 for the image signal S1'. Pulse signals S2' and S3' are respectively a clamp pulse CP and sample-hold pulse SH for the image signal S1'. The pulse signal S2' is output after the t1' period which is output after the above reset gate clock RG0. The pulse signal S3' is output after the t2' period which is output after the above reset gate clock RG0. Since, respective t1' and t2' are identical to Td'+Tc and Td'+Ts, they are described as follows: t1'=Tp+δTd+Tc and t2'=Tp+δTd+Ts. The clamp pulse CP and sample-hold pulse SH are a cyclic pulse signal of which the period is Tp, thus each clamp pulse CP and each sample pulse SH is identical to a pulse signal delayed for δTd+Tc and δTd+Ts, respectively. Consequently, when the delay time Td' is longer than the pixel clock period Tp by δTd, the on and off state of the switches in the switch group A and B is settled as if the delay time is δTd (<Tp). Namely, when δTd corresponds to the two counts of the shift counter 20, the switch A6 and B1 is set in the on state. Pulse signals S5' and S4' are a clamp pulse and sample-hold pulse for an image signal one period before the image signal S1'. Further, a pulse signal S6' is a sample-hold pulse two periods before the image signal S1'. Note that, even when the delay time is longer than two pixel clock periods (2Tp), output of the clamp pulse CP and sample-hold pulse SH can be controlled in the same way.

As described above, according to the present embodiment, a CCD drive control circuit that may generate a CCD drive pulse and CDS control pulse for an electronic endoscope with an arbitrary delay time can be obtained by dividing one pixel clock period into ten equal parts with a shift counter. Note that, in the present embodiment, since one pixel clock period Tp is divided into ten equal parts by the shift counter 20, the delay time of the clamp pulse and sample-hold pulse, which is set by the switches in the switch group A and B, can be set as to the unit ±Tp/20 (a half of Tp/10). However, for more accurate delay time setting, the above unit may be subtilized by raising the maximum number of the count number or by increasing division of the pixel clock period Tp. Namely, when a shift counter, which divides the pixel clock period Tp into n equal parts, is utilized, the delay time can be set by ±Tp/(2×n) units. Note that, a pulse duration for each pulse signal can be controlled by the number of switches that are set on.

Figure 6:
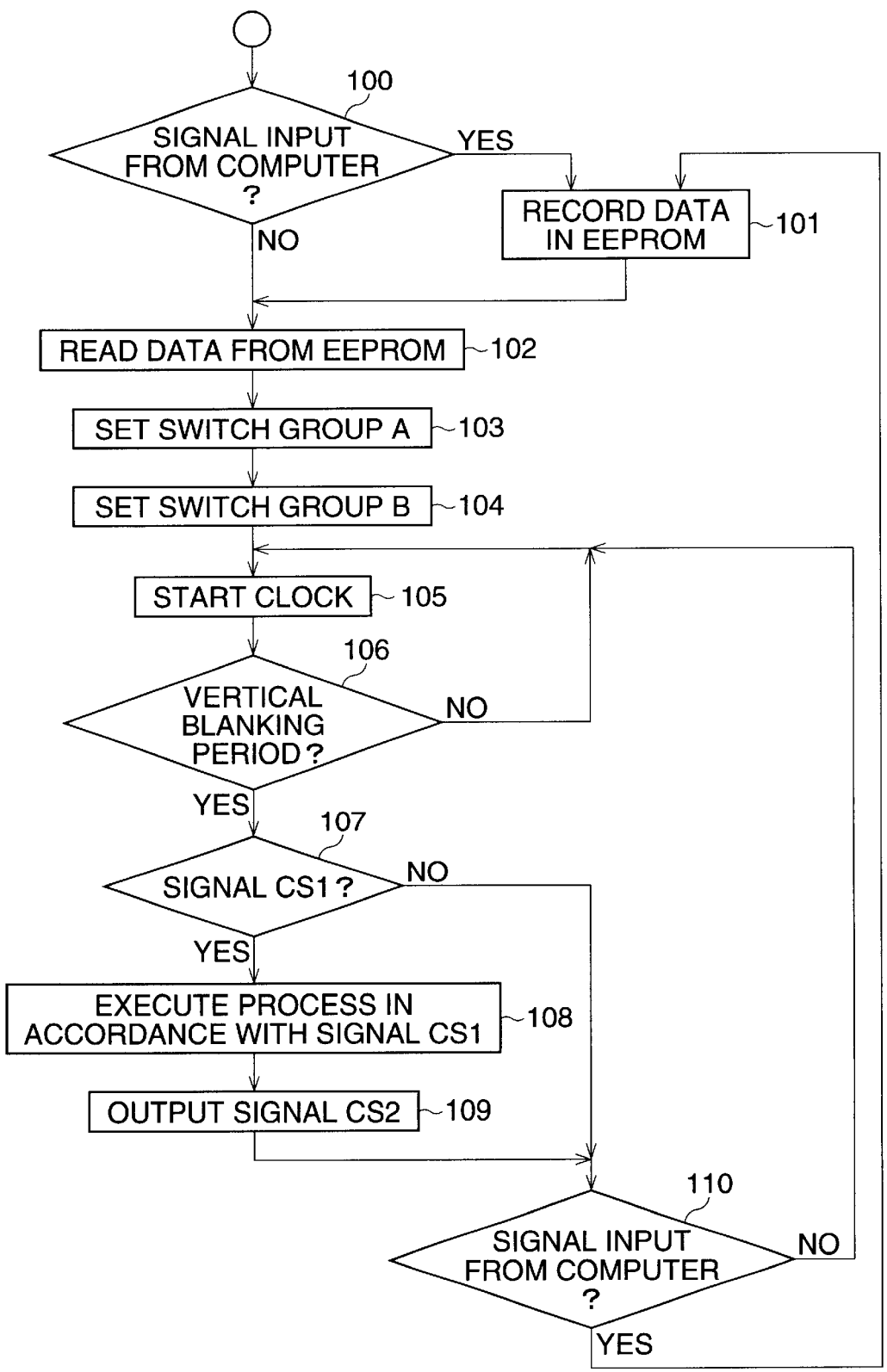
FIG. 6 is a flow chart of a program executed in the CPU of the electronic endoscope.
Figure 7:
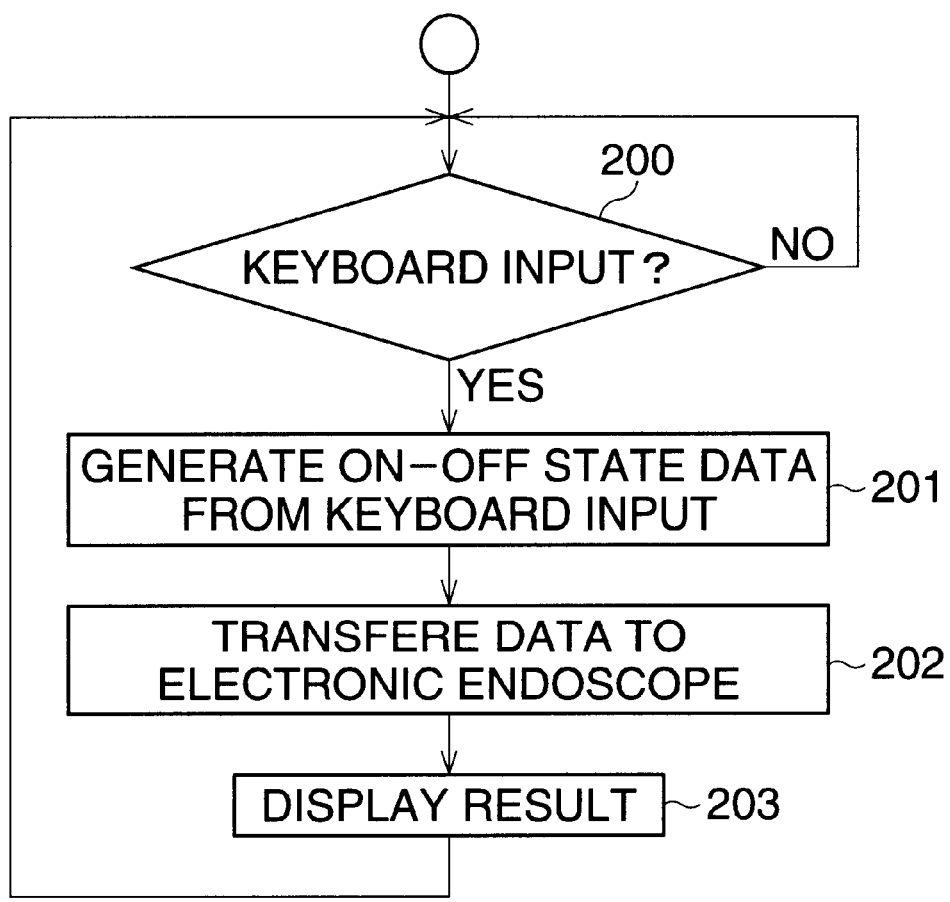
FIG. 7 is a flow chart of a program executed in the computer.

With reference to FIG. 6 and FIG. 7, the phase or delay time adjustment in the present embodiment is explained. FIG. 6 is a flow chart of a program executed in the CPU 27 of the electronic endoscope 10 (refer FIG. 2). FIG. 7 is a flow chart of a program executed in the computer 16 (refer FIG. 1), when the phase adjustment is carried out.

At the CPU 27 of the electronic endoscope 10, an input from the computer 16 is firstly checked at Step 100. When the CPU 27 detects an input signal from the computer 16, the process proceeds to Step 101 and the CPU 27 starts data interchange with the computer 16. The CPU 27 receives data required for the phase adjustment, from the computer 16, then the data is recorded in the EEPROM 30. The data, for example, represents which switches in the switch groups A and B are to be set on. When the above process at Step 101 ends, it proceeds to Step 102.

On the other hand, when no input signal from the computer 16 is detected at Step 100, the process directly proceeds to Step 102. At Step 102, the data for the phase adjustment is read from the EEPROM 30. Namely, the data, which represents which switches in the switch groups A and B are to be set on, is read in. In Steps 103 and 104, the on and off state of the switches in the switch groups A and B are actually set in accordance with the data from the EEPROM 30.

In Step 105, a clock pulse is output from the clock pulse generator 31 and input to the shift counter 20. In Step 106, whether it is in the vertical blanking period is determined. When it is not in the vertical blanking period, the process returns to Step 105 and the above process is repeated. Namely, while it is not in the vertical blanking period, clock pulses are cyclically fed to the shift counter 20 from the clock pulse generator 31, so that the CCD drive pulses and CDS control pulses are output from the shift counter, as to the above described method.

On the other hand, when it is determined that it is in the vertical blanking period, the process proceeds to Step 107 and whether a signal CS1 is output from the image-signal processing unit 13 is determined. When the signal CS1 from the image-signal processing unit 13 is detected in Step 107, the signal CS1 is received by the CPU 27 and processes that correspond to the signal CS1 are executed at Step 108. For example, if the received signal CS1 is data for adjusting the color balance, the data is stored in the EEPROM 30. In Step 109, a signal CS2 from the CPU 27 is output to the image-signal processor 14. In Step 110, input from the computer 16 is determined again. When there is no input from the computer 16, the process returns to Step 105 and the above-discussed succession of processes from Step 105 are executed. However, when a signal input from the computer 16 is detected at Step 110, the process returns to Step 101 and the data interchange process between the CPU 27 and computer 16 is resumed. Further, the processes below Step 101 are executed as discussed above.

When the signal CS1 from the image-signal processing unit 13 is not detected at Step 107, the process directly proceeds to Step 110 and the above process is executed. Note that, as obvious from the flow chart in FIG. 6, Steps 108 and 109 that relate to the signals C1 and C2 are carried out during the vertical blanking period.

With referring to FIG. 7, the flow chart of the program executed in the computer 16 is explained in the following.

When a delay time, for example, is input from the keyboard 17 at Step 200, the process proceeds to Step 201. Namely, at Step 200, the computer 16 waits for an input of a delay time that is obtained by an observation of the oscilloscope and input from the keyboard 17 by an operator. In Step 201, from the inputted delay time, switch data for setting the on-off states of the switch groups A and B are generated. The switch data is sent to the CPU 27 of the electronic endoscope 10 through the connector 29 and the interface circuit 28 in Step 202. Namely, it corresponds to Step 101 in the CPU's 27 process and the data sent from the computer 16 is stored in the EEPROM 30. In Step 203, information about the transferred data and its result is displayed on the screen of the computer display. Subsequently, the process returns to Step 200 and waits for a next keyboard input.

As discussed above, according to the first embodiment, a clamp pulse and sample-hold pulse which have an arbitrary phase difference can be generated by the shift counter 20 and the switch groups A and B, so that the delay time can be easily adjusted according to the length of the connected electronic endoscope by a simple and miniature circuit as opposed to an analog circuit that applies a potentiometer. Further, the phase between a clamp pulse and sample-hold pulse can be easily adjusted by only setting the on-off states of the switch groups A and B by a computer connected to a CPU of an electronic endoscope, thus a cumbersome operation, such as, for example, adjusting a knob of a potentiometer, is not required for an operator. Furthermore, according to the first embodiment, only a connector for an interface cable needs to be exposed when the phase adjustment is required. The arrangement and disposition of a connector to the cover of an electronic endoscope are more flexible than they are for a potentiometer utilized in an analog circuit. Namely, in an analog circuit, although a potentiometer with a complicated mechanical structure cannot be disposed apart from a CCD drive circuit and CDS circuit, with the structure indicated in the first embodiment, there is no difficulty in disposing a connector for an interface cable distant from the other circuits. Therefore, the arrangement of the connector may be designed more flexibly. Further, a waterproof design becomes easier.

Figure 8:
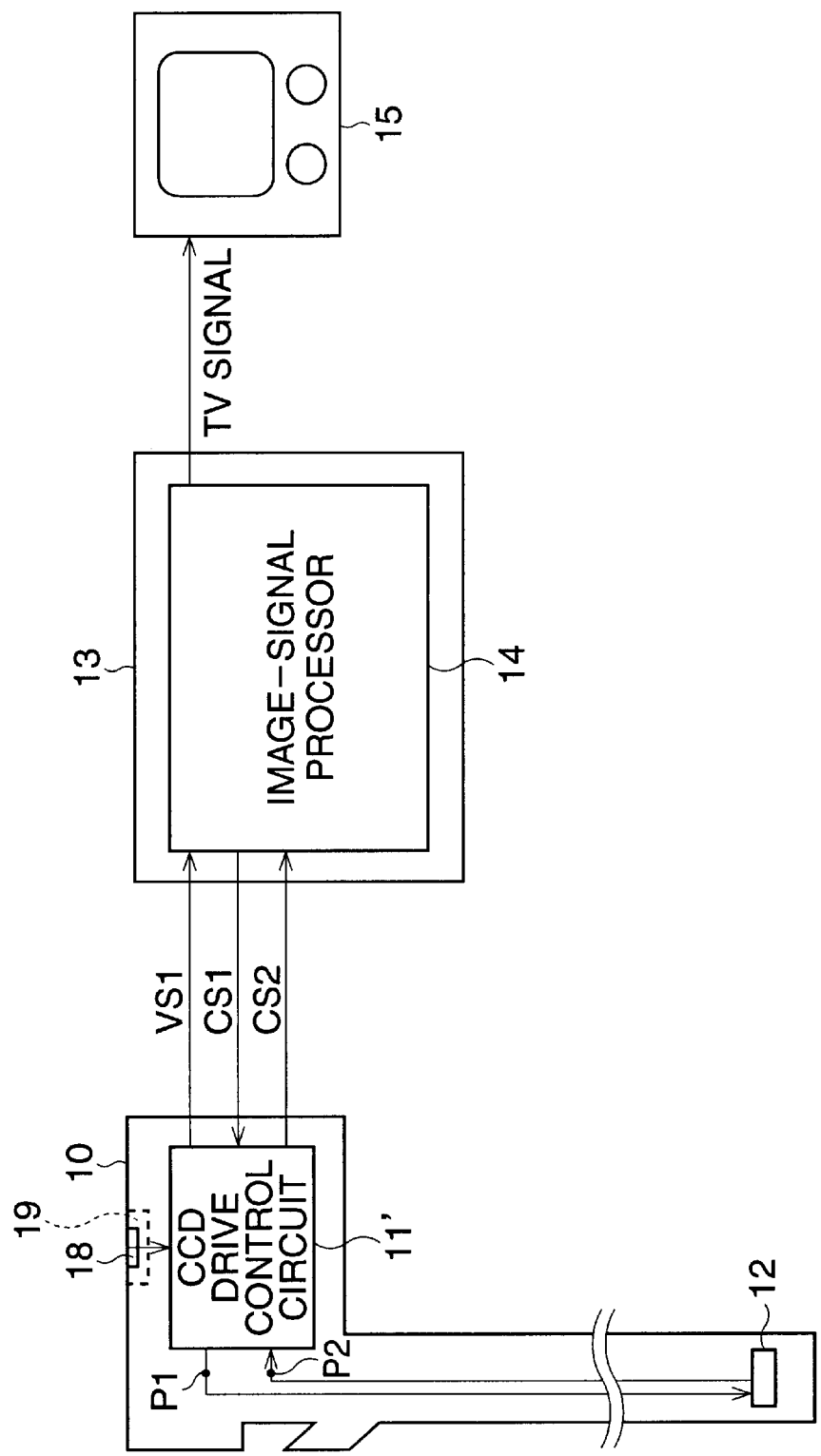
FIG. 8 is a schematic showing an electrical construction of an electronic endoscope system of the second embodiment of the present invention.
Figure 9:
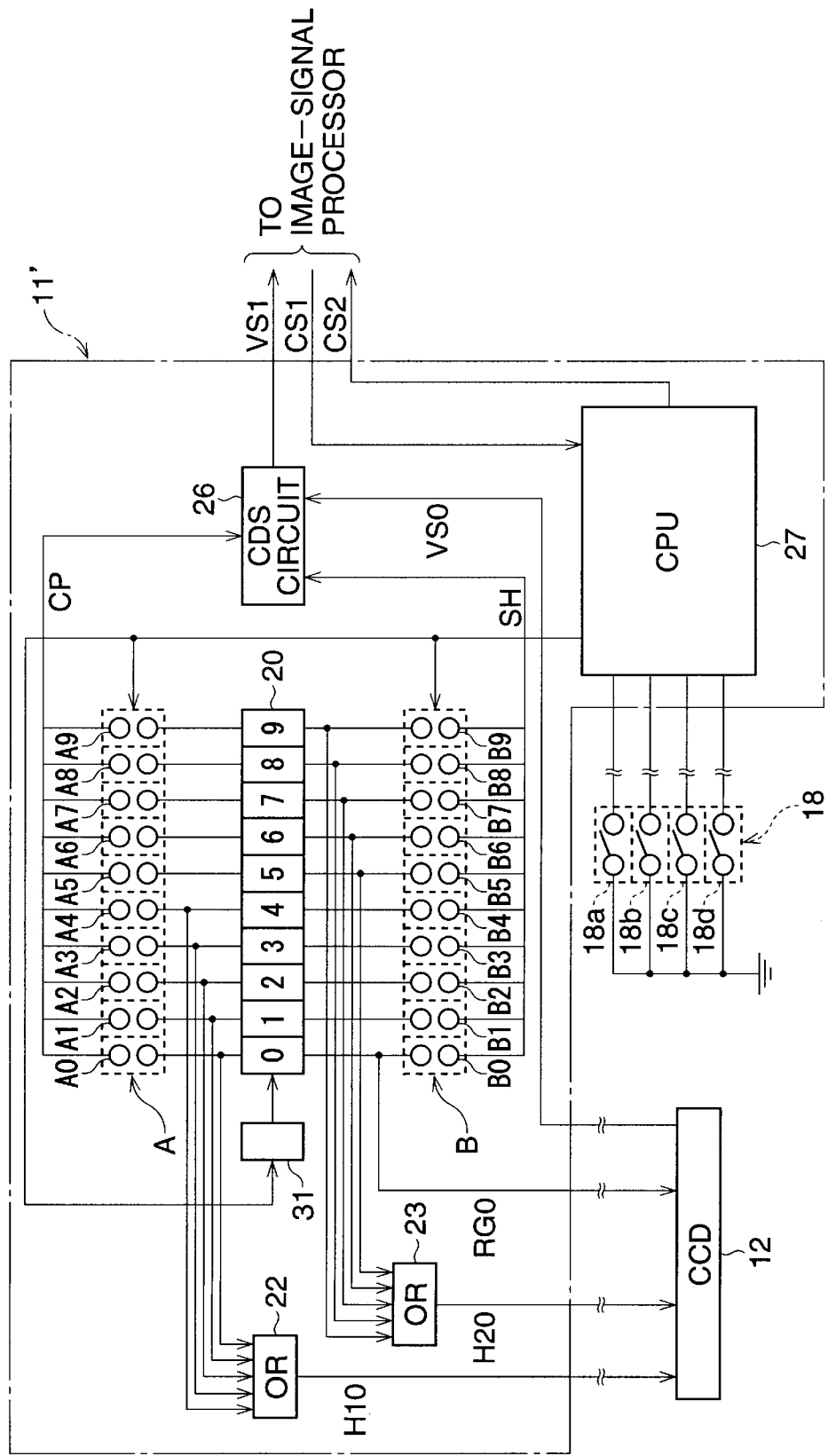
FIG. 9 illustrates the details of the CCD drive control circuit in the second embodiment.

With reference to FIG. 8 and FIG. 9, a second embodiment of the present invention is explained. Since the second embodiment is similar than the first embodiment, members that correspond to the first embodiment are referred to by the same reference numbers.

FIG. 8 is a schematic showing the construction of an electronic endoscope system of the second embodiment of the present invention.

An electronic endoscope 10 is detachably connected to an image-signal processing unit 13 and the image-signal processing unit 13 is connected to an image indicating device, such as a TV monitor 15, by a video cable. Inside an operating handle of the electronic endoscope 10, a CCD drive control circuit 11' is provided. On the distal end of flexible conduit of the endoscope, CCD (imaging device) 12 is provided. Further, the switch group 18 (third switch group), which may be comprised of a DIP switch, is connected to the CCD drive circuit 11'. The switch group 18 is disposed at the concave portion formed on the surface of the casing of the operating handle and shield with a waterproofed cap 19.

In the image-signal processing unit 13, an image-signal processor 14 is provided. The CCD 12 is controlled by CCD driving pulses (e.g. a CCD horizontal-register transfer clock and reset gate clock), which are fed from the CCD drive control circuit 11', and an image capturing process under a conventional R (red), G (green), B (blue) sequential method is carried out. Signals detected by the CCD 12 are sampled at a CDS circuit (refer FIG. 9) inside the CCD drive control circuit 11', then transferred to the image-signal processor 14 of the image-signal processing unit 13 as video signals VS1.

At the image-signal processor 14, a conventional signal processing is executed as discussed in the first embodiment and composite video signals are fed to the TV monitor 15. Signal CS1 and CS2 are also transmitted between the electronic endoscope 10 and image-signal processing unit 13, as discussed in the first embodiment.

When the electronic endoscope is shipped from a factory or when maintenance is carried out, the output timings of the CCD driving pulse and CDS control pulses (i.e. clamp pulse and sample-hold pulse) are adjusted. Namely, relative phase between the CCD driving pulse and the CDS control pulses is adjusted. For example, the delay time of a signal transmission in the electronic endoscope is induced from the waveform obtained by an oscilloscope (not shown) connected to output terminal P1, which feeds the CCD driving pulse to the CCD 12, and input terminal P2, which receives video signals from the CCD 12, of the CCD drive control circuit 11'. An operator sets the on-off states of switches 18a to 18d (refer FIG. 9) of the switch group 18, as to the delay time induced by the oscilloscope. This adjusts the phase between the CCD driving pulse and the CDS control pulses.

With reference to FIG. 9, details of the CCD drive control circuit 11' in the present embodiment are explained. FIG. 9 schematically shows a block diagram of the electrical structure of the CCD drive control circuit 11' in FIG. 8.

The CCD drive control circuit 11' comprises a shift counter 20, OR circuits 22 and 23, switch groups A and B, CDS-circuit 26, CPU 27, and clock pulse generator 31. Further, the CCD drive control circuit 11' is connected to the CCD 12, switch group 18 which comprised of four switches 18a to 18d, and the image-signal processor 14 of the image-signal processing unit 13.

Video signals VS0 from the CCD 12 are sampled at the CDS circuit 26, then output to the image-signal processing unit 13 (refer FIG. 8) as video signals VS1. The CDS circuit 26 is controlled by CDS control pulses, i.e. clamp pulse CP and sample-hold pulse SH. The clamp pulse CP is output from the switch group A which comprises ten switches A0 to A9. The sample-hold pulse SH is output from the switch group B which comprises ten switches B0 to B9.

Each of the switches A0–A9 and B0–B9 of the switch groups A and B is respectively connected to the shift counter 20. Numbers, 0 to 9, inscribed in each square of the shift counter 20 correspond to a number counted by the shift counter 20. The squares represent the terminals of the shift counter 20. Namely, the shift counter 20 in FIG. 9 schematically indicates the function of the shift counter 20. The shift counter 20 counts the number of regular pulse signals (clock pulses), which are fed from the clock pulse generator 31, in the range between 0 to 9. Pulse signals are output to the respective terminals of the shift counter 20, which correspond to the current count number of the shift counter 20. When the count number reaches the maximum number 9, the shift counter 20 again starts counting from 0 and this counting process is repeated.

Switches A0 to A9 and B0 to B9 are connected to the terminals of the shift counter 20, which respectively corresponds to each count numbers 0 to 9. Therefore, the shift counter 20 outputs a pulse signal to the switch corresponding to the current count number as discussed in the first embodiment.

A clamp pulse CP is output from the shift counter 20 via an on-state switch of the switch group A. A sample-hold pulse SH is output from the shift counter 20 via an on-state switch of the switch group B. The on or off states of the switch groups A and B are set by the CPU 27 according to the on-off states of the switches 18a to 18d of the switch group 18.

One side of the each switch 18a–18d is connected to each of the four in-port terminals of the CPU 27 and the other side is grounded. Namely, by the on-off states of the four switches 18a–18d, four-bit data can be provided to the CPU 27. According to this four-bit data, the CPU 27 controls the on-off states of the switch groups A and B.

With the above structure, the same pulse signal generating operation for the CCD drive pulse and CDS control pulse, as is the first embodiment, is obtained by the second embodiment.

Next, relations between the four-bit data provided by the on-off states of switch group 18 and the switch groups A and B, by which the on-off states are set by the four-bit data, are explained.

Each switch group A and B comprises ten switches, thus there are $2^{20}$ combinations for the on-off sates. However, in one pixel clock period Tp, the preferable timing Tc and Ts (see FIG. 4) to clamp and sample-hold a signal, from the beginning of the reset period Tr, is constant. Therefore, when the output timing for one of the clamp pulses CP or sample-hold pulses SH is given, the other timing can be derived from the given timing. Further, as discussed in the first embodiment, disregarding whether the delay time exceeds the pixel clock period Tp, an arbitrary output timing for the clamp pulse CP and sample-hold pulse SH can be obtained by setting the on-off states of the switches A0–A9 and B0–B9, which correspond to the count numbers 0 to 9. Therefore, only ten combinations that correspond to 0 to 9 of the count numbers, which represent output timing for one of the clamp pulses CP or sample-hold pulses SH, are required for the switch group 18 to represent the on-off states of the switches. As a result, four-bit data are enough for the present embodiment. Note that, the number of the switches in the switch group 18 or the number of the data bits may be altered according to the number of divisions of the pixel clock period and the contents of the information to be set.

As described above, according to the second embodiment, a similar effect as that for the first embodiment is obtained.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications No. 2000-165563 and No. 2000-165579 (both filed on Jun. 2, 2000), which are expressly incorporated herein, by reference, in their entireties.

What is claimed is:

1. A sampling pulse generator utilized in an electronic endoscope which comprises an imaging device, comprising:
   a sampling circuit that samples image signals obtained by said image capturing device;
   a driving-pulse generating processor that generates driving pulses for said imaging device;
   a clock-pulse generator that cyclically generates clock pulses;
   a shift counter that comprises a predetermined number of output terminals and that cyclically counts said clock pulses within said predetermined number, wherein count numbers have one-to-one correspondence with said output terminals and a signal is only output to a terminal corresponding to a current count number;
   a first switch group that comprises switches connected to each of said output terminals;
   a second switch group that comprises switches connected to each of said output terminals; and
   a switch-setting processor that sets on-off states of said switches in said first and second switch groups;
   wherein said driving-pulse generating processor generates said driving pulses by using signals from said output terminals of said shift counter and at least two types of sample pulses that control said sampling circuit are generated by using signals from said first and second switch groups of which said on-off states are set by said switch setting processor.

2. A sampling-pulse generator according to claim 1, wherein said switch-setting processor comprises a recording medium that records data relating to said on-off states for said first and second switch groups, and said on-off states of said switch groups are set in accordance with said data recorded in said recording medium.

3. A sampling-pulse generator according to claim 2, further comprising a recording processor that sets said data.

4. A sampling-pulse generator according to claim 3, wherein said recording processor is controlled by instructions from a computer connected to said electronic endoscope.

5. A sampling-pulse generator according to claim 2, wherein said recording medium comprises EEPROM.

6. A sampling-pulse generator according to claim 1, wherein said sampling circuit comprises a correlated double sampling circuit and said two types of sample pulses comprise a clamp pulse and a sample-hold pulse, and said clamp pulse is output from said first switch group and said sample-hold pulse is output from said second switch group.

7. A sampling-pulse generator according to claim 1, wherein said driving pulses are generated by using logical sum of signals fed from predetermined terminals of said output terminals, and said predetermined terminals correspond to consecutive count numbers of the cyclic count within said predetermined number.

8. A sampling pulse generator according to claim 7, wherein said imaging device comprises a CCD and said driving pulses comprise a CCD horizontal-register transfer clock, in which said CCD horizontal-register transfer clock is generated by signals from said predetermined terminals and the number of said predetermined terminals corresponds to half of said predetermined number.

9. A sampling pulse generator according to claim 1, wherein said switch-setting processor comprises a third switch group that sets said on-off states for said first and second switch groups, and said on-off states of said first and second switch groups are set in accordance with binary data produced by switches in said third switch group.

* * * * *